G. A. GILBERTSON.
TRANSMISSION DEVICE.
APPLICATION FILED JULY 15, 1916.
1,240,334.
Patented Sept. 18, 1917.
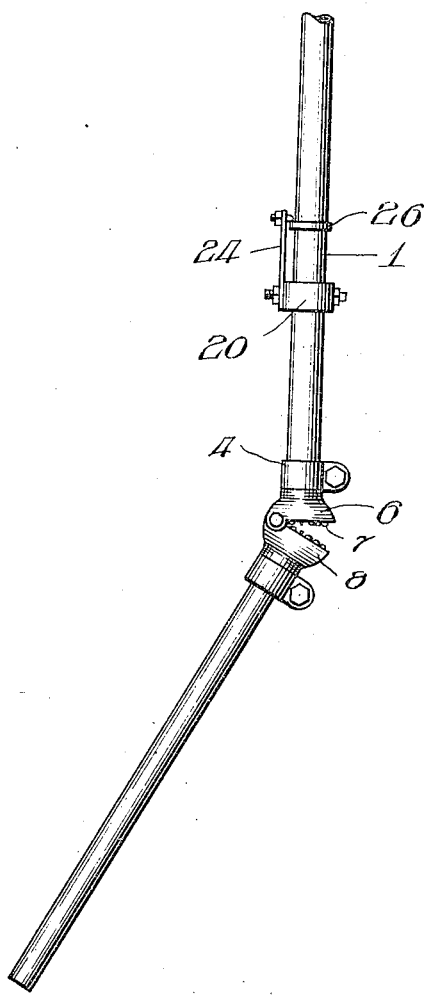
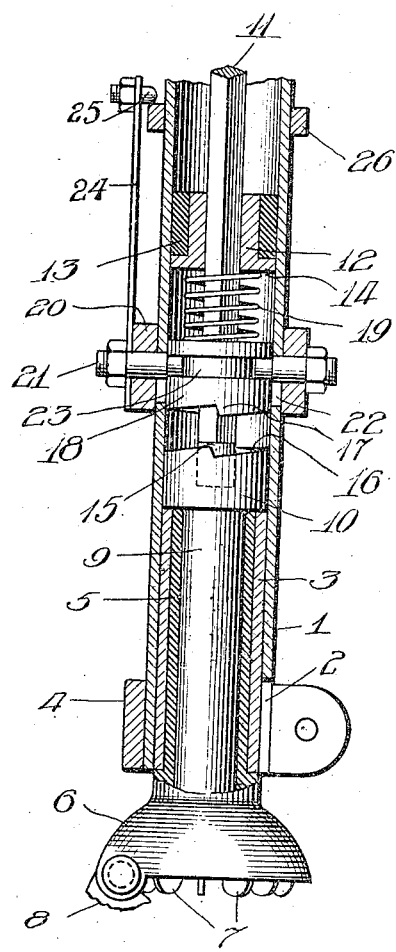
Witness:
Harry S. Gaither
Inventor:
Gustav A. Gilbertson
by Chamberlin Freudenreich
Attys

UNITED STATES PATENT OFFICE.

GUSTAV A. GILBERTSON, OF BENSON, MINNESOTA.

TRANSMISSION DEVICE.

1,240,334.  Specification of Letters Patent.  Patented Sept. 18, 1917.

Original application filed March 13, 1916, Serial No. 83,999. Divided and this application filed July 15, 1916. Serial No. 109,431.

*To all whom it may concern:*

Be it known that I, GUSTAV A. GILBERTSON, a citizen of the United States, residing at Benson, county of Swift, State of Minnesota, have invented a certain new and useful Improvement in Transmission Devices, and declare the following to be a full, clear, and exact description of the same, such as will enable others skilled in the art to which it pertains to make and use the same, reference being had to the accompanying drawings, which form a part of this specification.

My invention has for its object to produce a simple, effective and reliable clutch device between the parts of a shaft as, for example, a drop shaft of a sheep shearing apparatus.

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is a side view of the lower end of the drop shaft of a sheep shearing apparatus and the tool supporting means; and Fig. 2 is a vertical central section on an enlarged scale, the tool supporting device being omitted.

Referring to the drawing 1 represents a tube which may be the lower end of a drop shaft supporting tube such as illustrated in my prior application 83,999, filed March 13, 1916, of which the present application is a division. The lower end of the tube is split as indicated at 2. Within the lower end of the tube is a sleeve, 3, which is conveniently held in place by a clamping band, 4, surrounding the tube and clamping it tightly upon the sleeve. Extending through and rotatable in the sleeve is the tubular stem, 5, of a housing or casing, 6, in which lies one member 7, of a pair of complementary universal gears, the other member of which is carried by the tool supporting device, 8. The gear 7 is carried on the lower end of a stem, 9, having on its upper or inner end a head, 10, of a diameter large enough to permit it to engage with the ends of both the members 3 and 5.

Arranged axially within the tube is a rotatable shaft, 11, which may have any desired cross section but is illustrated as being square in order that it may be received within the square opening in another shaft section and thus provide a driving connection which permits the two shaft sections to be moved relatively to each other in the axial direction. Where the shaft is made square it may conveniently be surrounded by a cylindrical bushing, 12, fitting within a bearing sleeve, 13, brazed or otherwise rigidly secured within the tube; the bushing being conveniently made with a flange, 14, on its lower end which prevents it from being pushed upwardly through the sleeve, 13. The lower end of the shaft, 11, is preferably made cylindrical as indicated at 15 and projects into a cylindrical bore or seat in the member 10. The upper face of the head 10 is provided with teeth, 16, complementary to a series of teeth, 17, on the under face of a part, 18, slidably mounted on the shaft 11 but rotatable with the latter; the teeth 16 and 17 forming clutch teeth and the head 10 and the member 18 being therefore complementary coöperating clutch members. Between the bushing, 12, and the member 18 is a spring, 19, which serves both to hold the bushing up and to press the clutch member, 18, down. When free to do so, the member 18 descends until its clutch teeth are in an operatve engagement with the teeth on the head 10.

For operating the clutch I have placed on the member 1 a sleeve, 20, carrying one or more pins or projections, 21, extending through a slot or slots, 22, in the tube and into an annular groove, 23, in the clutch member 18. The connection between the member 18 and the sleeve therefore permits the member 18 to be rotated independently of the sleeve, while enabling the sleeve to shift the member 18 in the axial direction.

Normally, when free to do so, the spring and the weight of the member 18 cause the member 18 to engage with the complementary clutch member, thus producing a driving connection between the shaft and the gear 7. When the operator desires to stop the operation of the tool or other thing which is driven by the gear 7 he simply slides the sleeve 20 upwardly on the tube, thus opening the clutch and permitting the driving shaft to rotate without rotating the gear. For the convenience of the operator, and in order to make it unnecessary for him to hold the clutch open by hand, I prefer to provide a suitable catch device which will automatically operate to hold the clutch open when it is shifted to its open position, and yet will yield easily under a simple downward pull on the controlling sleeve and permit the two parts of the clutch to become reëngaged when the driving connection is again desired. In the arrangement shown, I have secured upon the sleeve, 20, an upwardly projecting spring finger, 24, having at its upper end a lateral projection, 25, adapted to spring above or below a rib or ring, 26, or other suitable projection fixed to the supporting tube 1. By making the ring or projection of the proper width, the clutch will be held closed by the catch as well as being held in its open position; thus preventing the member 18 of the clutch from accidentally jumping out of engagement with the coöperating member.

The means illustrated for supporting the casing 6 permits the tool carried thereby to be swung about the axis of the drop shaft without turning the latter or, in other words, it affords a swivel connection between the tool and the driving supporting means. It will of course be understood that this feature need not be used in connection with the clutch; although, in an apparatus of the kind illustrated, it is a useful association as it brings the swivel and the clutch together and simplifies the construction.

While I have illustrated and described with particularity only a single form of my invention and explained only a single use thereof, I do not desire to be limited to the exact structural details thus illustrated and described or to any particular use; but intend to cover all forms and arrangements covered by the terms employed in the appended claims which constitute the definitions of my invention.

I claim:

1. In an apparatus of the character described, a tube, a driving shaft and a driven shaft arranged in alinement with each other in the tube, a clutch between said shafts, a clutch actuating collar surrounding said tube and movable lengthwise thereof, means connecting said collar with said clutch, and a catch device for yieldingly holding said collar in one of its positions.

2. In an apparatus of the character described, a tube, a driving shaft and a driven shaft arranged in alinement with each other in the tube, a clutch between said shafts, a clutch actuating collar surrounding said tube and movable lengthwise thereof, means connecting said collar with said clutch, and a catch device for yieldingly holding said collar in each of its working positions.

3. In an apparatus of the character described, a tube, a driving shaft and a driven shaft arranged in alinement with each other in said tube, a clutch in the tube between said shafts, a clutch actuating collar supported on the tube and slidable lengthwise thereof, said tube having a slot therein in proximity to the clutch, and a part extending from said collar through said slot and into engagement with the clutch.

4. In an apparatus of the character described, a supporting tube, a driving shaft and a driven shaft alined within the tube, a clutch between said shafts, an actuating collar for the clutch slidably supported on the tube for movements lengthwise thereof, a spring finger carried by said collar, and interlocking shoulders on the spring finger and on the tube for causing the collar to be held yieldingly in a predetermined position when it is moved into that position.

5. In an apparatus of the character described, a tube, a driven shaft arranged within the tube and having an enlarged end, a driving shaft within the tube extending into and revoluble in said enlarged end, a part revoluble with said driving shaft and capable of sliding axially thereon located in proximity to said enlarged end, the adjacent faces of said enlarged end and of the aforesaid part having complementary clutch teeth, a collar surrounding the tube, and a connection between said collar and the aforesaid part on the driving shaft.

6. In an apparatus of the character described, a tube, a driving shaft and a driven shaft alined within the tube, one of said shafts having a clutch face on its end, a part slidable on the other of said shafts but rotatable therewith having a clutch face complementary to the aforesaid clutch face, and means including a device mounted on the exterior of the tube for shifting said part along its supporting shaft to bring said clutch faces into and out of engagement with each other.

7. In an apparatus of the character described, a tube, a driving shaft and a driven shaft alined within the tube, one of said shafts having a clutch face on its end, a part slidable on the other of said shafts but rotatable therewith having a clutch face complementary to the aforesaid clutch face, a spring acting on said part and tending normally to hold it in a position in which said clutch faces engage with each other, and means on the exterior of said tube for moving said part lengthwise of its supporting shaft.

8. In an apparatus of the character described, a tube, a driving shaft and a driven shaft alined with each other in the tube, one of said shafts having a cross section other than circular, a bushing fitting about the latter shaft and having a cylindrical exterior bearing surface, a clutch member slidable lengthwise and rotatable with the latter shaft, a coöperating clutch member on the other shaft, and a spring arranged between said bushing and the slidable clutch member.

9. In an apparatus of the character described, a tube, a driving shaft and a driven shaft alined with each other in the tube, one of said shafts having a cross section other than circular, a bushing fitting about the latter shaft and having a cylindrical exterior bearing surface, a clutch member slidable lengthwise and rotatable with the latter shaft, a coöperating clutch member on the other shaft, and a spring arranged between said bushing and the slidable clutch member, said bushing and said tube having engaging shoulders to prevent the bushing from moving lengthwise in the tube.

10. In an apparatus of the character described, a tube, a driven shaft projecting into the tube and having an enlargement at its inner end, a bearing sleeve surrounding said shaft and having one end in engagement with said enlargement, a second sleeve surrounding the aforesaid sleeve and also engaging said enlargement at one of its ends, said tube being split in the vicinity of said sleeves, means for rigidly clamping the tube about the sleeve, and means in the tube for driving said shaft.

In testimony whereof, I sign this specification.

GUSTAV A. GILBERTSON.

Copies of this patent may be obtained for five cents each, by addressing the "Commissioner of Patents, Washington, D. C."